INVENTORS.
FRANCIS O. UNDERWOOD

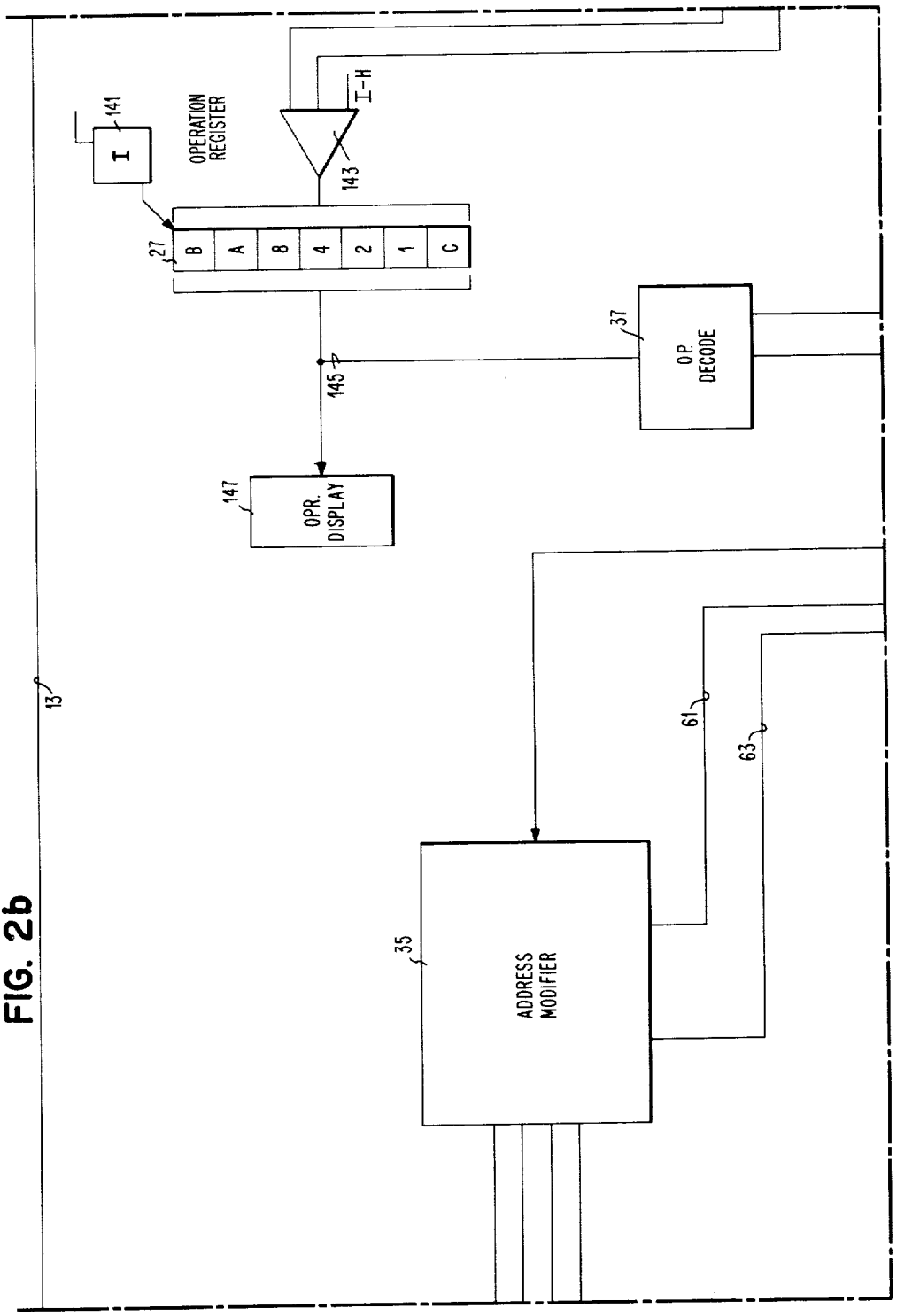

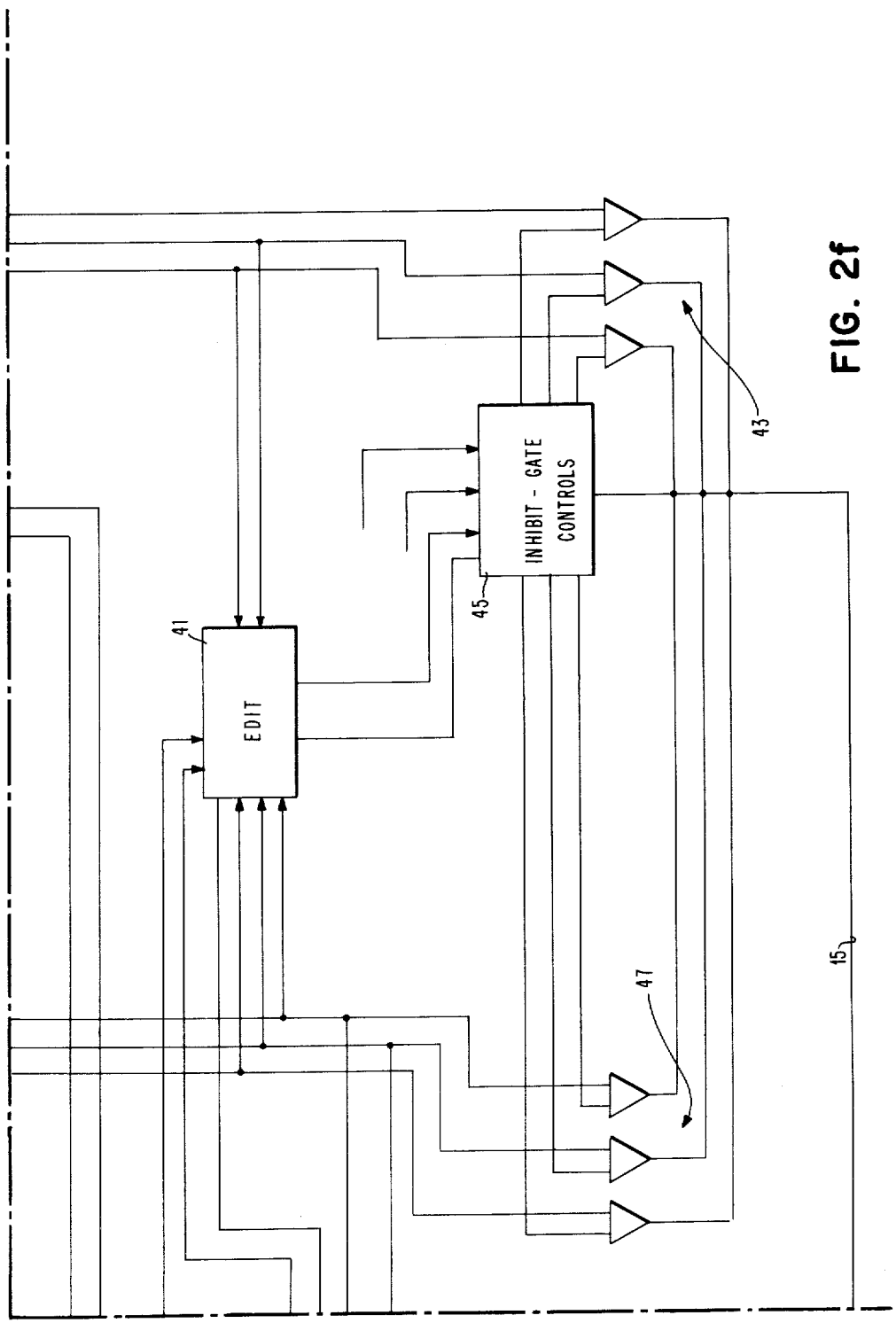

Feb. 12, 1963　　F. O. UNDERWOOD　　3,077,580
DATA PROCESSING SYSTEM
Filed Sept. 8, 1959　　13 Sheets-Sheet 12
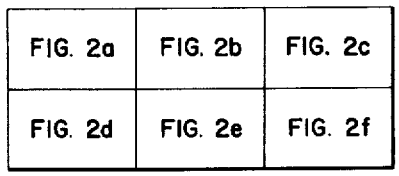
FIG. 6
FIG. 8
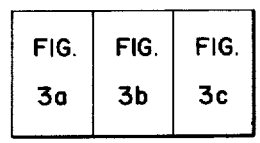
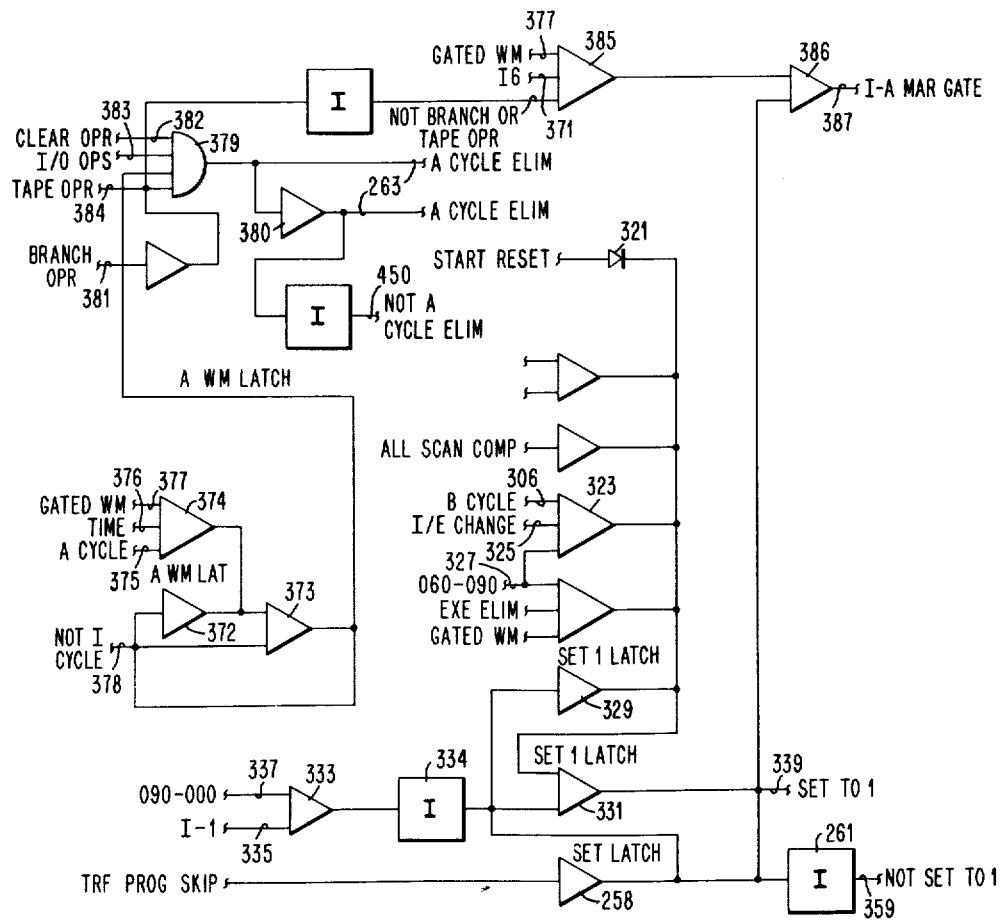
FIG. 5

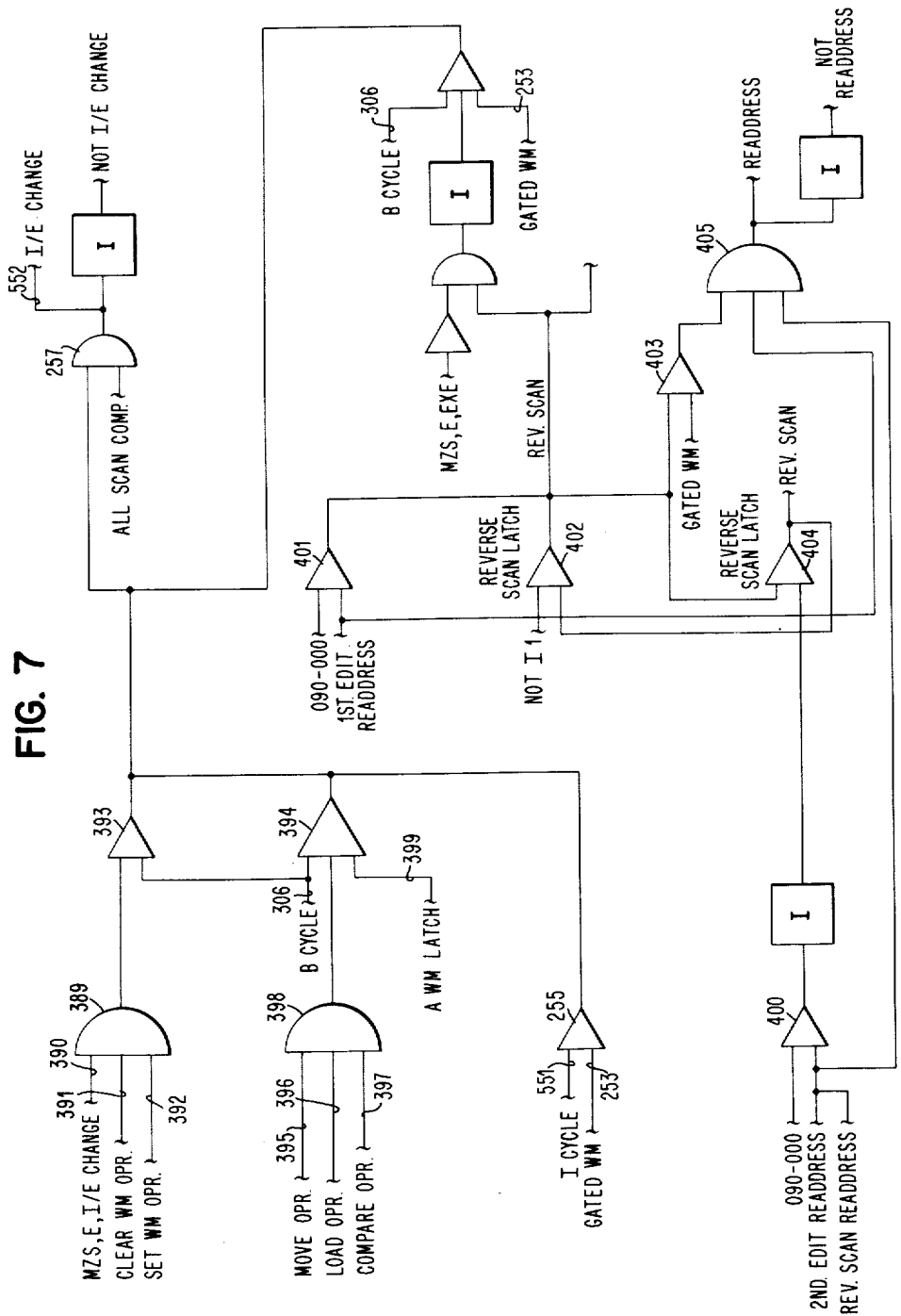

United States Patent Office 3,077,580
Patented Feb. 12, 1963

3,077,580
DATA PROCESSING SYSTEM
Francis O. Underwood, Vestal, N.Y., assignor to International Business Machines Corporation, New York, N.Y., a corporation of New York
Filed Sept. 8, 1959, Ser. No. 838,457
7 Claims. (Cl. 340—172.5)

The present invention relates to an improved data processing machine.

In particularly summarizing the concepts contained in the present invention, the following are believed to be the more significant.

The addresses of the locations of data words or operands to be processed are contained in of storage address registers which are independent of one another in determining the number of characters in a particular data word for a selected operation. The data words are of variable length and each storage address register continues to present the address of the next successive digit to be used until the end of the word with which a particular register is concerned is detected. In determining the end of a data word, a character marking bit is used with the last character therein. This character marking bit is therefore used to attach a particular significance to a character and the concept of employing such a bit in combination with the data character itself is believed to be an important contribution to the art.

In the present invention, the instruction word is also of variable length and may contain as many operation codes as desired with the addresses of the first character in each operand. In the instruction word, the operation code contains a character marking bit in order to indicate their function as an operation code. With the storage address registers independently operable to indicate the addresses of successive characters to be utilized in the process, sequential operation codes need only use the address standing therein at the termination of the last operation. With this concept, time may be saved in not generating new addresses for each operation.

In the processing of data, the characters from storage are read on successive cycles as indicated by the storage address registers and recirculated through two registers. One operand is also always restored to its original location in memory while the other may not be. The result of the process of the operands is however placed at the address of the other operand in its associated cycle. The processing apparatus senses the characters stored in the registers to determine what will be placed at the second location. The time for recirculation is thus reduced to a minimum.

In further simplification of the operation of processing, the machine contains a normal sequence of operations which continues unless signaled by the process unit to alter the sequence.

It is therefore an object of the present invention to provide an improved data processing apparatus.

It is a further object of the present invention to provide a data processing apparatus including a storage for characters to be processed in which the address of the next successive character is obtained independently of the addresses of other characters.

It is another object of the present invention to provide a data processing apparatus including a storage for characters to be processed in which the addresses of successive characters in different fields are obtained independently of one another.

A further object of the present invention is to provide a method for marking characters to establish a control function associated with the character.

A still further object of the present invention is to provide a data processing machine in which data words to be processed are of variable length.

Still another object of the present invention is to provide a data processing machine in which instruction words are of variable length to include a plurality of operation codes.

Another and further object of the present invention is to provide a data processing machine in which data is recirculated and processed on the recirculation loop.

Another object of the present invention is to provide a data processing machine in which the processing of data is accomplished in a normal sequence which is selectably varied in accordance with the operation being performed.

The foregoing and other objects, features and advantages of the invention will be apparent from the following more particular description of a preferred embodiment of the invention, as illustrated in the accompanying drawings.

In the drawings:

FIG. 1 is a schematic illustration of the invention.

FIGS. 2a—2f illustrate the detailed circuit of the entire invention.

FIGS. 3a—3c illustrate a portion of the detailed circuit of the cycle control.

FIGS. 5 and 7 are illustrations of the detailed control circuits for the machine.

FIGS. 6 and 8 are illustrations of the manner in which FIGS. 2a—2f and FIGS. 3a—3c are to be combined.

GENERAL DESCRIPTION

Figure 1:
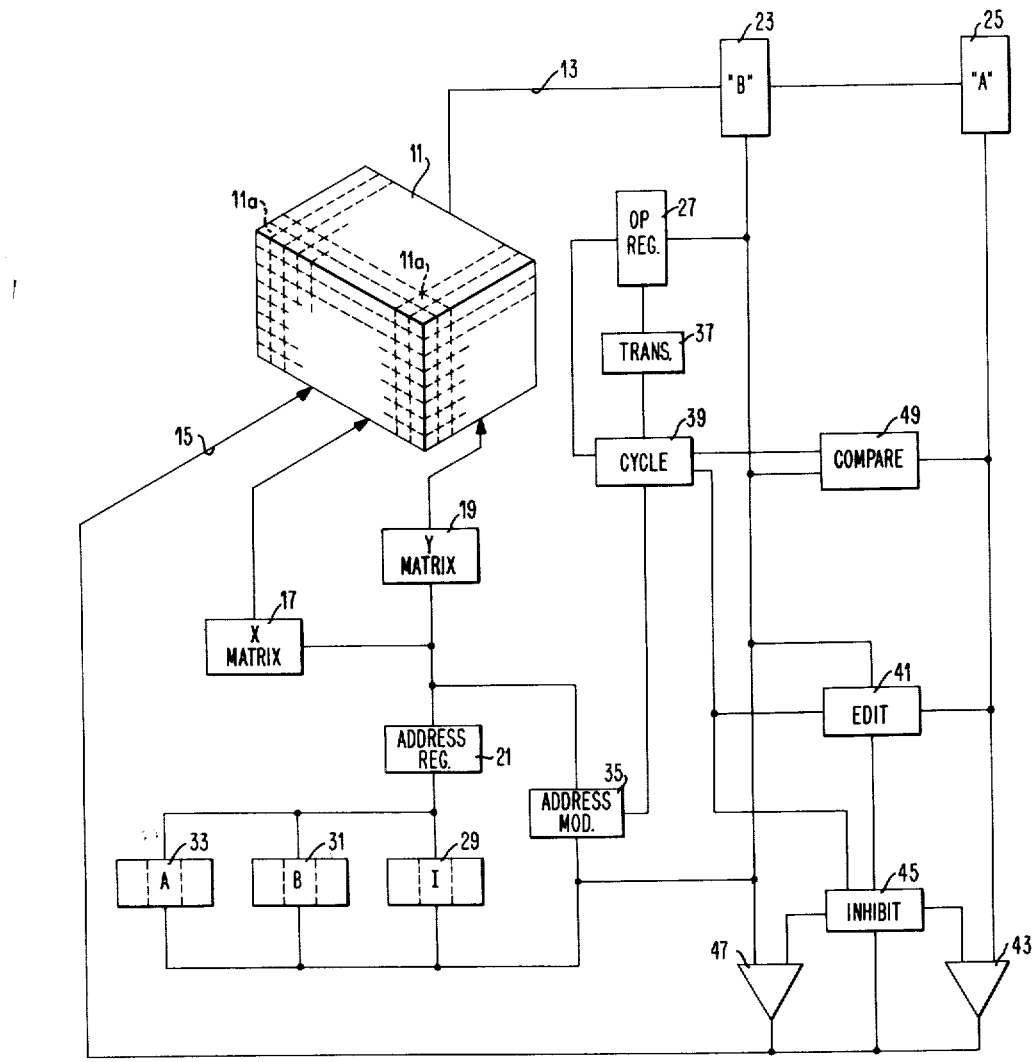

The data processing machine shown in FIG. 1 utilizes a serial by digit, parallel by bit character flow. A magnetic core storage 11 contains all characters which are to be utilized in the internal operation of the machine. Each character will contain a combination of eight bits (1 or 0) to signify the particular significance of the character. In the particular illustration used in FIG. 1, there would be one character contained in each vertical intersection 11a which contains eight planes of magnetic cores.

With each vertical intersection of cores set to indicate a particular character, the character may be read out on line 13, or read into on line 15 by selecting a desired coordinate position. This coordinate position is selected by an X-matrix and a Y-matrix which decode an indicated number standing in an address register 21 to obtain the contents of the desired coordinates in storage indicated by this number.

When the coordinate selection is made by the X-matrix and Y-matrix, the magnetic cores containing the individual bits of a character are reset to "0." When reset to "0" any character standing therein prior to this selection will be transferred to a buffer recirculation register 23 as the combination of bits previously contained in said column of cores.

The character then standing in the buffer recirculation register 23 may be transferred to a storage recirculation register 25 and also returned to the same position in storage 11 by line 15, or, is utilized in a logic operation and the results stored in the location from which it originated. Operation code characters are stored in an operation register 27 in contradistinction to the above. However, this portion of the apparatus will be explained hereinafter.

In the operation of the present machine, the address of the next instruction is contained in an instruction register 29. The address, which is a number, specifies the location of the first digit of an instruction word contained in storage 11, in a group of locations designated generally as instruction word locations. The instruction word assumes the following format:

Instruction Format

This machine uses variable length instruction as follows:

```
                 POSITIONS
    1    2    3    4    5    6    7    8
    OP
    OP   d
    OP   A    A    A
    OP   A    A    A    d
    OP   A    A    A    B    B    B
    OP   A    A    A    B    B    B    d
```

"OP" is the one-character operation code which defines the basic instruction. The "OP" code position must also contain a word mark.

AAA is a three-character coded memory address of a data word.

BBB is a three-character coded memory address of a data word.

The instruction length is indicated by a "word mark" located in the next position in memory to the right of the instruction.

The instruction word format as shown consists of an Op code digit in the first position and two sets of address words A and B.

The Op code which determines the operation of the machine is a one-character designation such as E (for edit), A (for add), etc. The "A" address and the "B" address contain three digits each and specify the location of an initial digit of two operands which are to be used in the process designated by the operation code. Other operation codes may be used in seriatum following the "A" and "B" address if the operations designated thereby are to be performed on groups of characters which follow the first groups of characters designated by the initial address of "A" and "B."

As evidenced by the instruction word, the instructions may be of any length or as short as desired (for some operations). In a similar manner the operands, or data on which an operation is to be performed, are of no fixed length. To designate the beginning of an instruction or the end of an operand, a marking bit (hereinafter referred to as "word mark") is utilized with the particular digit concerned to indicate the fact. This word mark is carried in a core plane (#8).

In operation, the instruction word is read from storage 11, under control of the instruction address register 29, character by character to the buffer recirculation register 23. The first character, which is the operation code, is stored in the operation register 27. The succeeding characters constitute addresses which enter the "A" and "B" address registers 33 and 31. The instruction address register 29 is advanced to the next address by an address modifier 35, which adds "one" to the number stored in the instruction address register which is recirculated to the instruction register as the address for the next instruction digit and recirculated into storage in its original location.

After the complete instruction addresses of operands have been read into the memory address register "A" and "B," abbreviated hereinafter as A MAR and B MAR, the operation will proceed in accordance with the operation character stored in the operation register 27. The operation register 27 is connected to a translator 37 which translates a particular operation character to a form recognizable by a cycle control 39.

The cycle control 39 is the controller for the machine and transmits all the necessary signals to all parts of the apparatus to provide an appropriate operation for the operation code then stored in the operation register 27.

In the cycle control 39, A and B cycles originate to read data from storage 11 to the registers 23 and 25. In an "A" cycle, a character is read from storage 11 at the location specified by the A MAR 33 into the "B" register 23 on the read portion of the cycle and back into the same digit position in storage 11 on the write portion of the "A" cycle at the same time that it is stored in the "A" register 25. On a "B" cycle, a character is read from storage 11 corresponding to the address specified by the B MAR 31 and stored in the "B" register 23. During the write portion of the "B" cycle, this character may be read back into storage at the same location or a different character generated within the machine may be inserted at this location.

In general, therefore, there are two operation cycles "A" and "B" with two recirculation registers "A" and "B," 25 and 23 to accept characters addressed by the A and B MARS 33 and 31, respectively. Each time an "A" or "B" cycle is used, the address standing in the "A" or "B" address register is modified, by "one," to designate the next successive digit location in storage 11 which will be read on the next related cycle. In an ordinary case the results of an operation on operands stored at an "A" and "B" location will be found at the "B" location.

Description of Components

The storage device shown at 11 consists of a plurality of magnetic cores arranged in rows, columns, and planes as shown in FIG. 1. As well known, the magnetic core referred to herein has a substantially rectangular hysteresis characteristic which enables the magnetic state of the device to be changed from one position or another in accordance with a current passed through a coil wrapped therearound. By setting these cores in one state or another, the presence or absence of particular bits may be indicated, and a representation of data may be conveyed. The bits of each digit are contained on the successively elevated planes of cores as shown. Each digit is represented by a particular coordinate position therefor.

In reading out particular digits of information, it is therefore necessary only to select a particular rectangular coordinate which is applicable to all planes and pulse the same therefor to read out the information contained in all cores contained in that particular coordinate position. When the cores at a particular location are selected, there will be a number of pulses generated on output 13, which would be eight separate connections. In other words, when the coordinate position is sensed, the cores are switched and the change in magnetization is detected by the windings contained therearound. When a character is read out therefor from the storage, it is necessary to regenerate the same back into storage if it is desired to retain the same. This type of apparatus is shown generally in Patent No. 2,939,120.

The input to memory is shown by a line 15, referring to FIG. 2, representing eight connections and connected to current drivers 49 which furnish sufficient current to the cores at a selected coordinate position to switch the same in accordance with the desired code configuration.

Figure 2A:
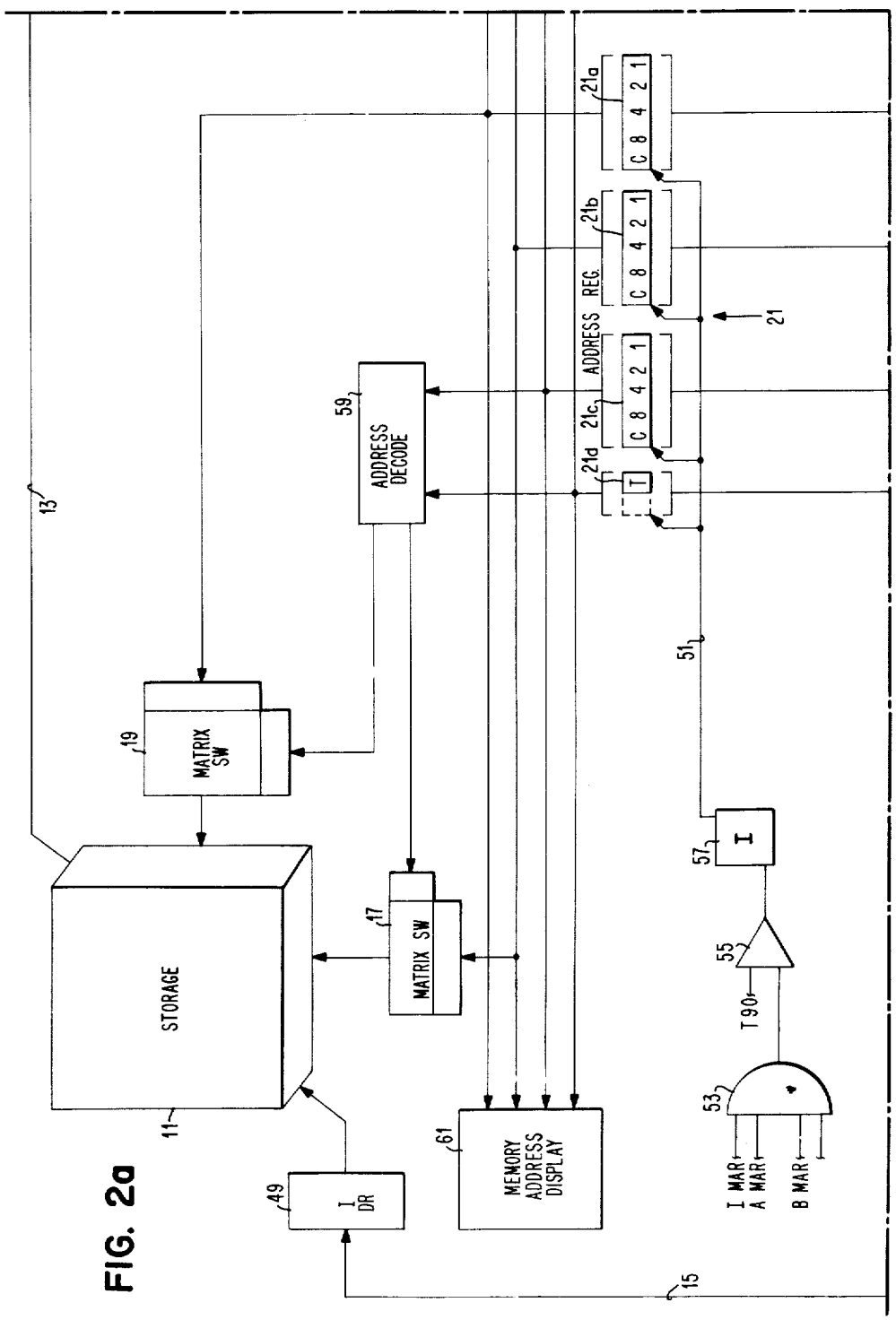
Figure 2C:
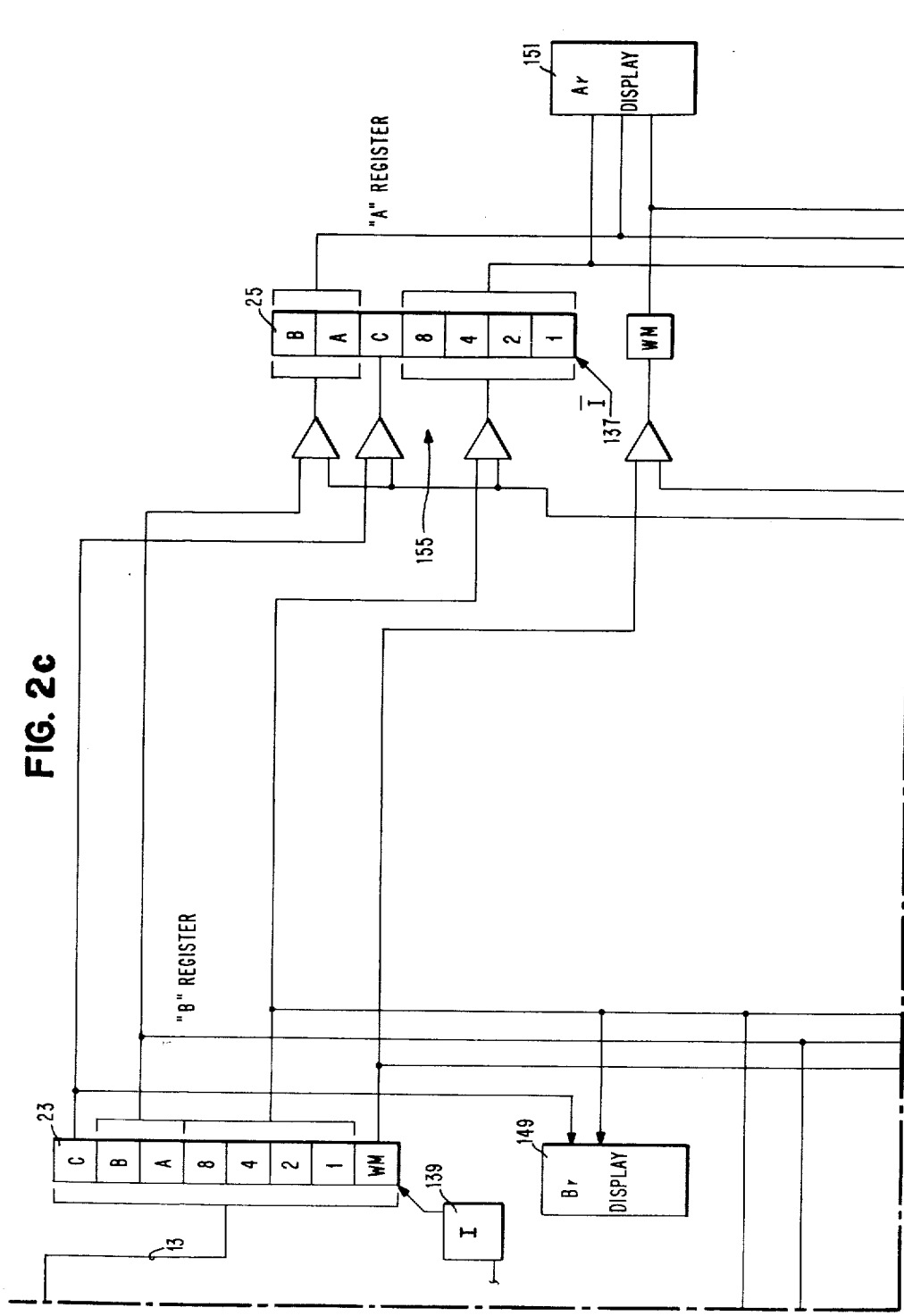
Figure 2D:
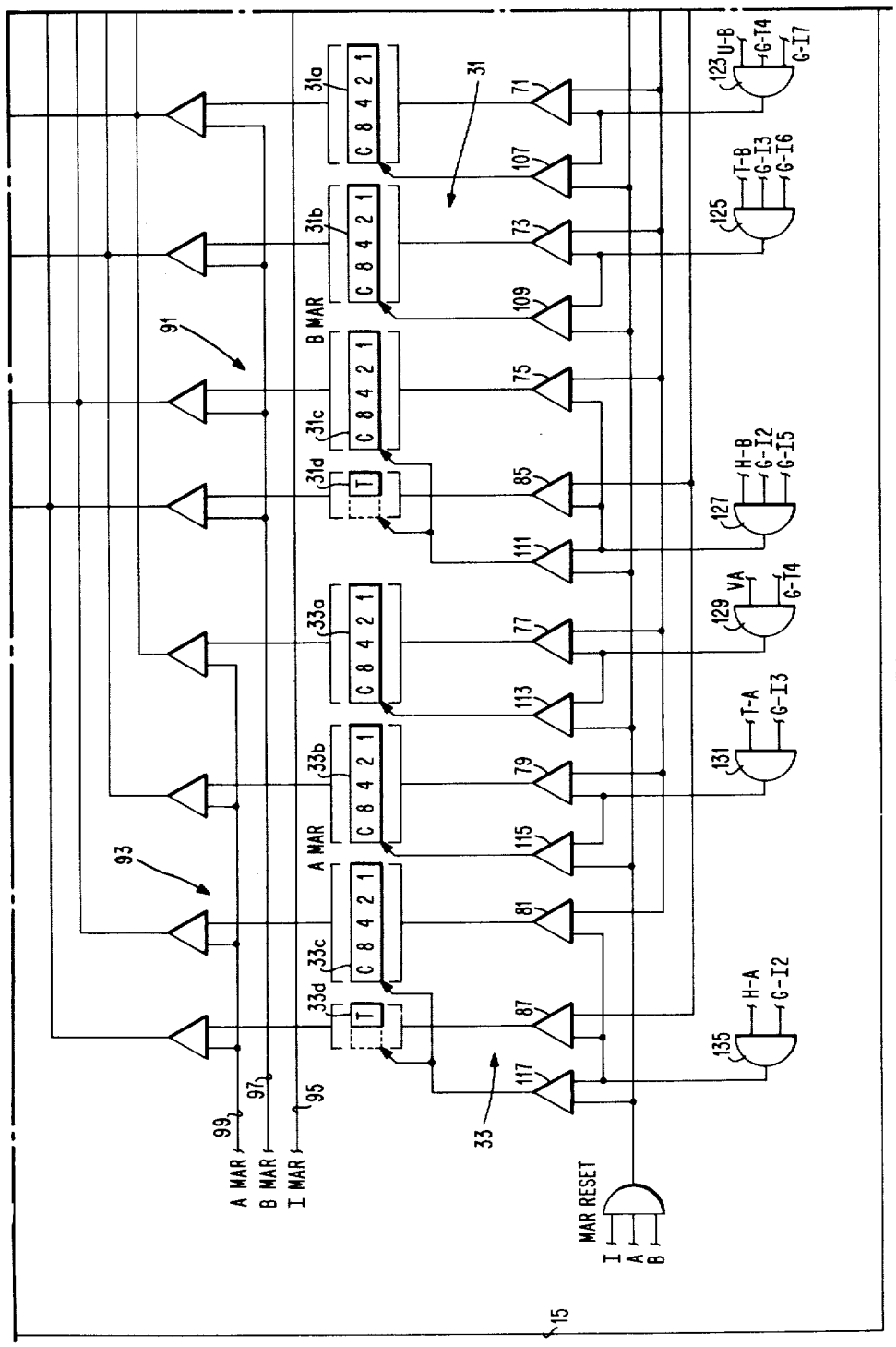
Figure 2E:
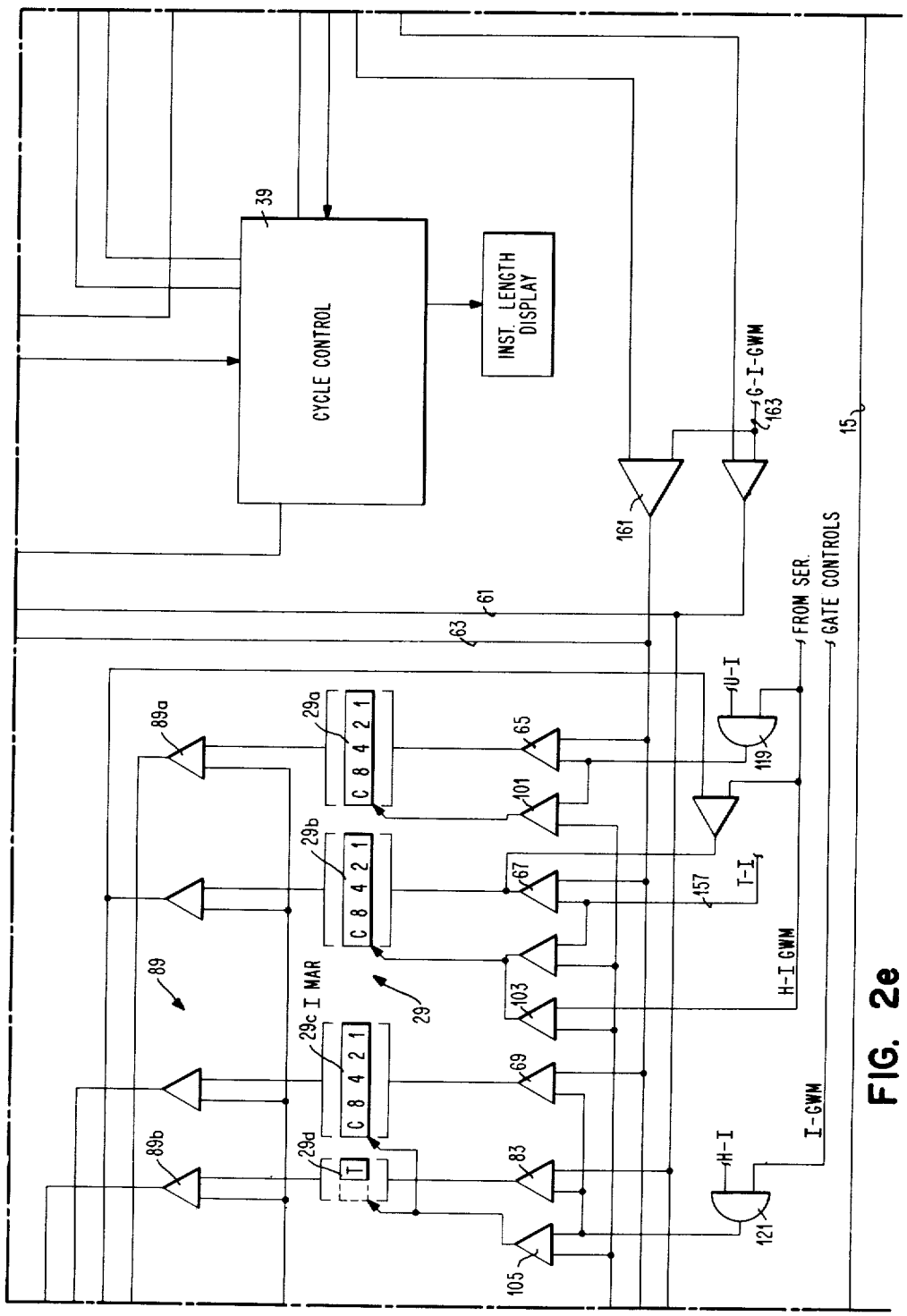

In FIG. 2a, the address register 21 contains a series of stages 21a to 21d. Each stage consists of a series of bistable elements, cores, transistor circuits, etc., which hold the indicated number of the desired coordinate position. Stage 21d which represents "one thousand" contains only one bit. Stages 21c, 21b and 21a represent hundreds, tens, and units. The address register is reset by means of a line 51 connected to initiating signal lines connected to an OR circuit 53 and timed by an AND circuit 55 connected through an inverter 57. This provides for resetting the stages at a predetermined time in a given cycle.

The outputs of the registers 21a–21d consist of as many lines as there are bits for a given stage. The bits for a stage are shown by the digits contained therein. The outputs of these registers are directed to matrix switches 17 and 19 which decode the number standing in the registers to a coordinate position. An address decode circuit 59 is shown for the thousand and hundreds digit position. These circuits have not been shown more particularly since it is believed that the operation of the same is obvious and in particular forms no part of the present invention.

The outputs of registers 21a to 21d are further directed to a memory address display 61 which indicates visually the number standing in the address register. The outputs of these registers are further directed to an address modifier 35 wherein the number standing in the register 21 is modified by incrementing or decrementing by one (1), for example, and transferring the same to the I memory address register (I MAR), the B MAR 31 or the A MAR 33 to set the registers to indicate the address of the character which is to be next drawn from memory.

The address modifier 35 which is shown schematically in FIG. 2b is not illustrated in detail by reason of the fact that its details form no part of the present invention. As mentioned above, its purpose is to increment or decrement the address stored in the address register by a given amount, for purposes of illustration the amount is given here as +1 or −1. The return from the modifier 35 is by means of a line 63 to a series of AND circuits 65, 67, 69, 71, 73, 75, 77, 79, and 81 which are connected to the units, tens and hundreds orders of each of the registers 29, 31 and 33. A line 61 from modifier 35 is connected to AND circuits 83, 85 and 87 connected to the thousands order of registers 29, 31 and 33.

The Memory Address Registers 29, 31 and 33 each consist of a series of stages as described in relation to the address register 21. The output of each is in parallel to the address register 21 by a series of AND gates 89, 91 and 93 for the respective registers 29, 31 and 33. It should be understood that the use of one AND circuit for a register represents as many AND circuits as necessary for the number of bits which are being transferred. Since stages such as 29a contain 5 bit positions, as indicated, these would of necessity be five AND circuits represented by AND circuit 89a. In a similar manner, the AND circuit 89b would represent one AND, i.e., the thousands bit. The desired register is selected by the AND circuits 89, 91 and 93 in combination with a line 95, 97 or 99.

A series of reset AND circuits 101, 103, 105, 107, 109, 111, 113, 115, and 117 are provided to reset the individual registers to zero in cooperation with the conditioning signals from OR circuits 119, 121, 123, 125, 127, 129, 131, and 135. The origin of these signals and their cooperation with the operation of the apparatus will be explained subsequently. The input illustrated here has the same meaning as to number of lines as do the outputs described previously. This is, of course, that the single line shown for setting a stage of a register indicates as many lines as there are bit positions within the register. The reset lines need not be individual for each bit position.

The operation register 27, FIG. 2b, is a single character static register having an input AND circuit 143, representing the seven circuits necessary for the seven bit positions shown therein. A reset inverter 141 is shown for changing the indication therein to zero. The static output of operation register 27 is shown at 145 and is connected to an operation display 147 and to an operation decode circuit 37. The decode circuit utilizes the character stored therein to translate from the combination of bit signals, an indication to the cycle control 39 of what the machine operation will be for this process. Other outputs are connected to the unit which is to control the machine for this operation. Note that one line goes to editing circuit 41, and one to the compare circuit 49, FIG. 1.

The "B" register 23 and "A" register 25 are similar to the operation register 27 and include reset means 139 and 137 and indicators 149 and 151. The "A" register further includes an input controlled by AND circuits 155 opened by the cycle control 39 for allowing information to pass therethrough.

The circuits shown as connected between the outputs of the "B" register 23 and the outputs of the "A" register 25 perform the various logic operations on the data stored in storage 11 and are selected by the operation code. These circuits will not be described in detail in the present specification.

Connecting the output of the "B" register 23 and the "A" register 25 to the storage 11 are series of AND circuits 43 and 47 each representative of a number of circuits equal to the bit positions to which they are connected in these registers.

Inhibit and gate controls 45 determine the operation of gates 43 and 47 in dependence upon controls from the various logic circuits. The inhibit gate 45 may further insert a predetermined character back into storage 11 independently of the data stored in either the "B" register 23 or "A" register 25.

The cycle control 39 contro's the apparatus by means of signal lines connected to all components in response to information derived from all components. This will be explained in more detail hereinafter. For the present, the machine will be described generally as to operation with the assumption that the cyc'e control is controlling the various components in sequence for that operation.

In general, there are three different types of cycles for the present machine. These are an (1) I cycle, (2) A cycle and (3) B cycle.

The I cycles are concerned with placing an instruction word in the correct locations in the machine. These are: (1) for the operation character—the Op register 27; (2) for the A address—A MAR 33; and (3) for the B address—B MAR 31.

*Operation of Apparatus*

The I MAR 29 is used to store an address of the instruction word to be used in the next operation of the machine. Assuming for example that the address in the I MAR is 001, this address is the location of the first digit in the instruction word portion of storage which is to be read out into the various registers.

The I MAR line 95 is pulsed and the information stored in the I MAR registers is transferred to the address register 21, where it is decoded by the decode circuit 59 and also by means of the matrix switches 17 and 19 to select the first digit from storage 11. For purpose of illustration, in the subsequent description, assume that the instruction word is E789300. This is stored at memory addresses 001 to 007 respectively. As it will be remembered from previous descriptions the letter E is an operation code while the addresses 789 and 300 belong respectively to the A and B MAR for the addresses of the operands to be used in the operation controlled by the Op code.

The operation code digit which is then read from storage location 001 is transferred to the B register 23 and then to the operation register 27. Further, the address register 21 which contains the I MAR address transmits this to the modifier 35 which in turn transmits back through the lines 61 and 63, the modified digit which is the address of the next character for the instruction word. This is also written back into memory.

In discussing the instruction word and the means by which the various characters stored at the individual locations are obtained, a ring is used to keep track of the various instruction digits so that for the seven digits which may be included in an instruction word, there are seven I-pulses, 1, 2, 3, 4, 5, 6, 7. For each instruction cycle 1–7, the I MAR 29 will be advanced by one by the address modifier and by timing signals to the OR circuits 119 and 121 and by the line 157 connected to AND circuit 67.

On instruction cycle I–2, the number contained in the I MAR (which is 002) affects the selection of a character from storage which is read into the B register where it is passed through an AND circuit 161 to the A MAR 33 and B MAR 31. Since the I cycle is I–2, the OR circuits 135 and 127 are passing signals to condition the AND gates 117, 87 and 81 and 111, 85 and 75 so that a hundreds and thousands digit will be set into stages 33c and 33d and 31c and 31d in accordance with the digit 7 which was standing at location 002.

This operation continues in sequence for the I cycles, I–3 and I–4. At this point, the number 789 which is stored in the A MAR is stored in the B MAR 31 also. This allows for certain operations which may be explained subsequently where it is desirable to use the same address of an operand for performing certain particular operations. However, for the present case, the next I cycle, I–5, continues and selects the character 3 which is placed into the B MAR register stages 31c and 31d through the signalling on an OR circuit 127 and conditioning the AND gates 111, 85 and 75. On the I–6 cycle, stage 31b is likewise set to 0 and on cycle 007, stage 31a is set to 0. At this point, the respective registers 33, 31 and 29 contain the numbers 789 300 and 008. As mentioned previously, 008 which is the address in the I MAR 29 will be the next instruction word for the subsequent operation which will follow after the one now to be described.

As will be remembered, the operation or the instruction words for this particular apparatus are terminated by means of an operation digit containing a word mark which as it will be remembered is another bit position carried with the character to indicate its significance. When the I MAR 29 contains 008, the machine will execute a cycle and the character stored at this location will be brought out to the B register. The word mark contained at this location which is part of the character representing the operation code for the next instruction word will be detected and the character will be placed into storage at the same location from which it originated, but no action will be taken with respect to the I MAR register by the address modifier 35 and the instruction therein will remain 008.

The sequence of operation for this is as follows: In the read portion of the instruction cycle, which approximates the first quarter thereof, the address modifier will add "one" to the units position of the I MAR. When the word is detected, however, in the B register the original digit in the address register 21 will be passed through the address modifier to the units position of the I MAR to restore this register to the number originally standing therein.

The A MAR 33 and the B MAR 31 now contain the address of the lowest order digit of the operands which are to be operated on in accordance with the Op code digit contained in register 27.

The operation code digit which has been shown in the present instant is for editing which will be described in reference to the system. As explained previously, the operation register will signal the edit control that the machine is ready for it to operate upon the operands as indicated by the addresses stored in the A and B MAR. The actual operation consists in most instances in transferring, on an A cycle, the character stored at the indicated address in the A MAR from memory to the B register and then to the A register and back into memory at the location from which it originated. The character therefore stored at the A MAR address is placed in the A register. The address modifier in this instance by control of the cycle control decrements the address standing in the A MAR by the method explained previously to give the next lower address. In this case, with the characters 789 stored in the A MAR, the decremented number for the next A cycle would be 788.

On a B cycle the number stored at address 300 will be brought to the B register and by virtue of the logic control which samples both the A register character and the B register character either returns the B character to its location in memory, returns the A character to the B location in memory, or inserts an entirely different character through the inhibit gate control. In any event, the results of a logic operation will be to place the resulting digit in the location specified by the B MAR from which the information was read on the B cycle.

Since the character stored in the A register must of necessity pass through the B register, it is believed evident that an A cycle will be taken only when the A digit is removed from the A register so that two cycles A and B will next be taken. The B cycle, in other words, is the cycle which brings out the second operand and stores the result of an A and B register comparison or logic process.

The operation will continue until a word mark is sensed in the B character which is removed from storage which signifies to the machine that the operation is terminated and a new instruction word is to be taken at the address stored in the I MAR 29. When an A word mark is carried by the A operand, its significance will be predetermined by the control or operation then being performed by the machine. However, the A word mark does not normally initiate an instruction cycle.

*Cycle Control*

The timing cycles of the present invention are: I cycles, which are used in reading instruction characters into the various registers; A cycles, which provide for taking a character stored at the address indicated in the A MAR storage and placing the same in the A register; and a B cycle in which a character stored at the address indicated by the B MAR is moved from storage to the B register. Each cycle is divided into 120 units of time, for example, a memory cycle would consist of a first interval of approximately 30 units for selecting the character stored at the address location specified by the memory registers, a second interval of approximately 60 units for processing the data, and a third interval of approximately 30 units for reading the character desired back into storage at the address which was then selected by the particular register. In the operation of the memory address registers, the cycles are divisible into four intervals of approximately 30 units of time, designated as units, tens, hundreds and G-time, respectively.

Figure 3A:
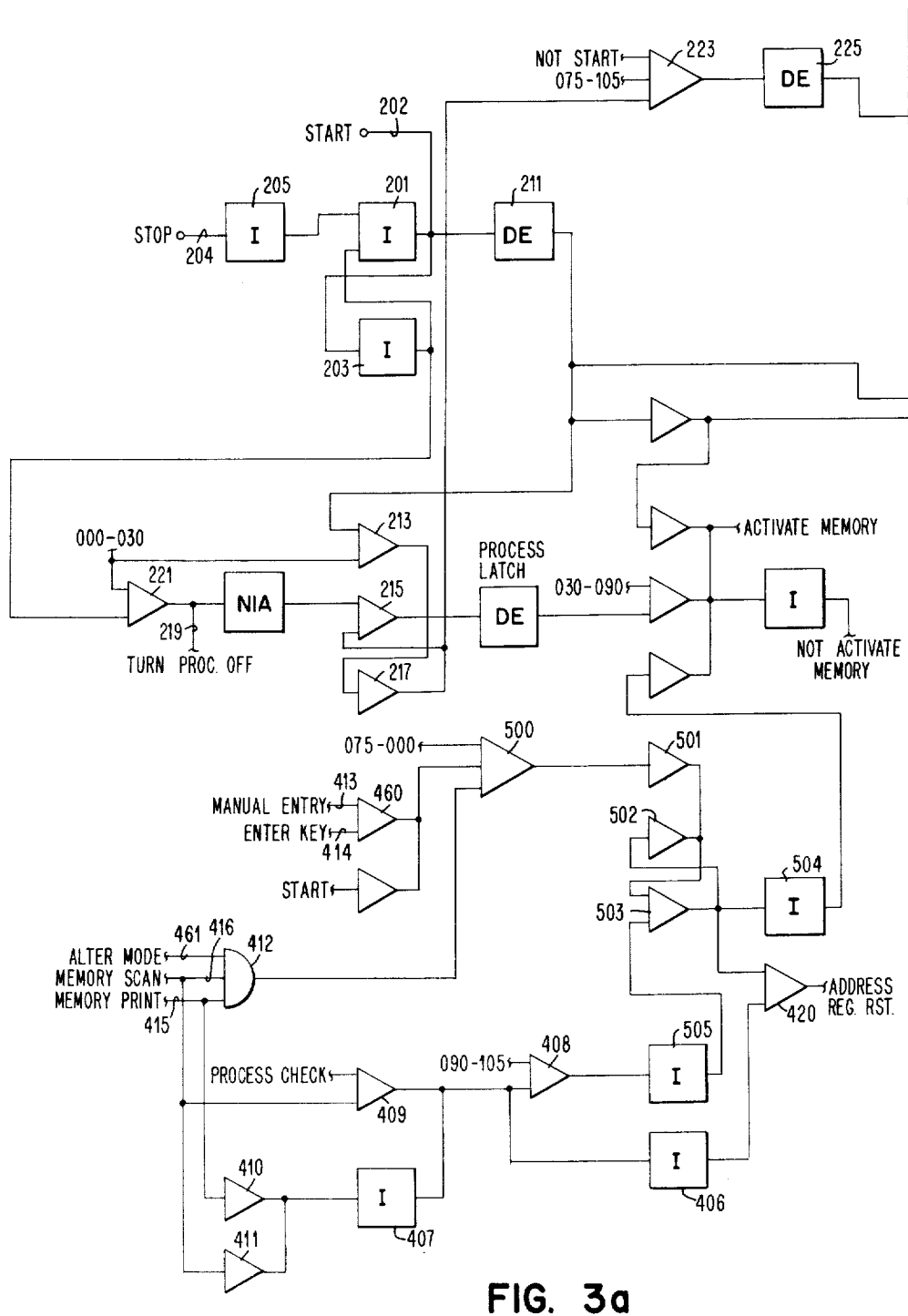
Figure 3B:
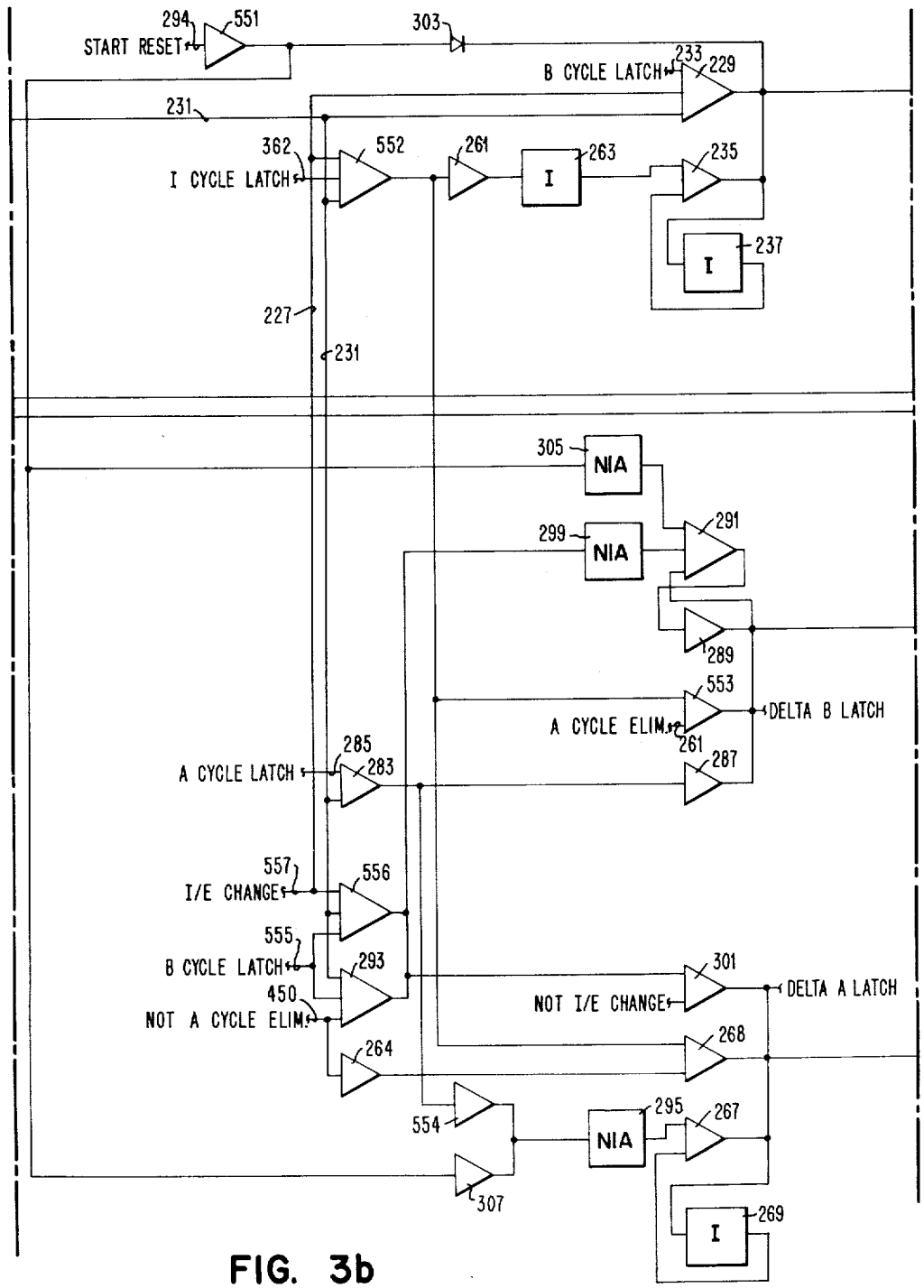
Figure 3C:
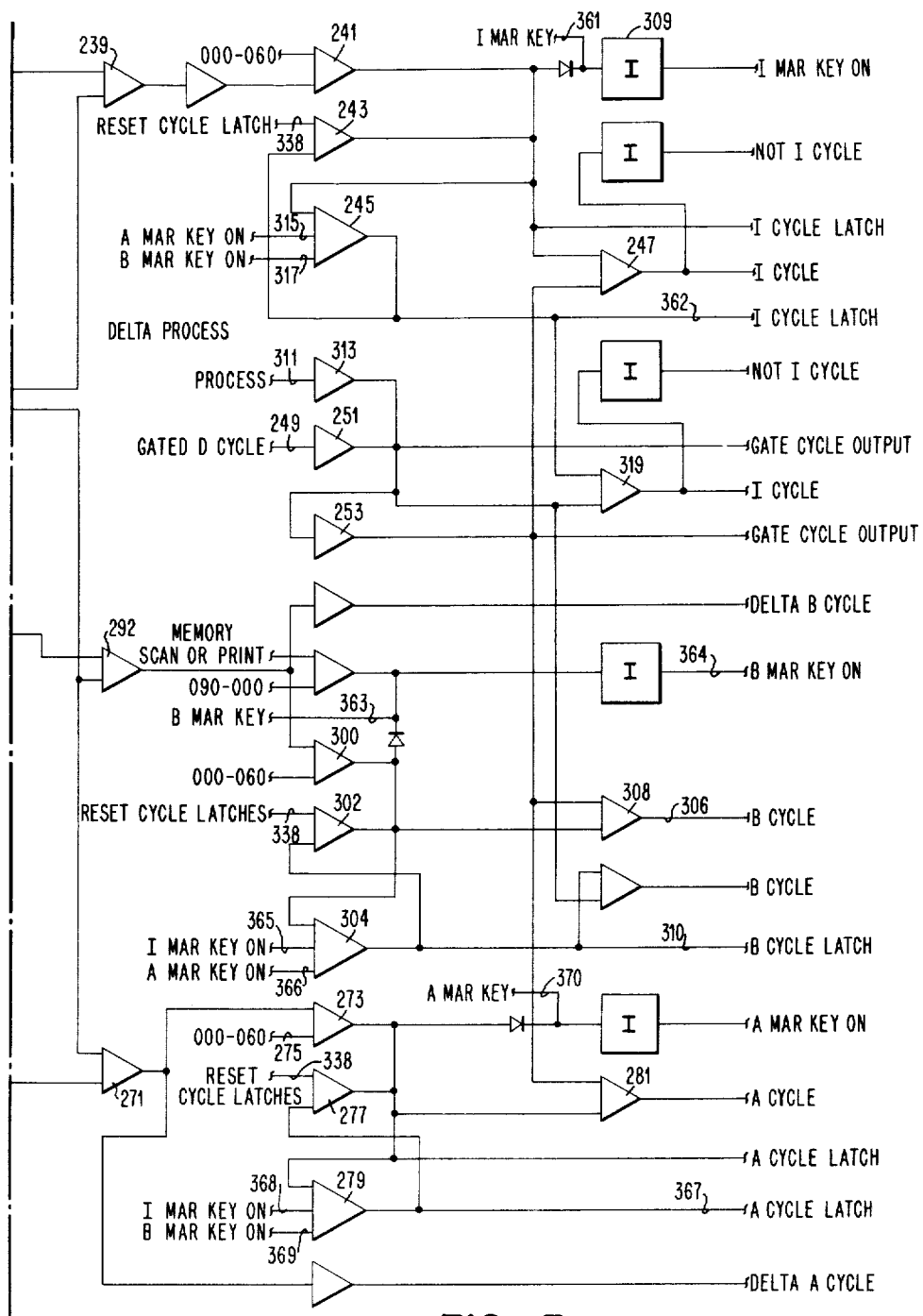

The cycle control shown in FIGS. 3a—3c contains delta process latch 201, 203, FIG. 3a, which is turned ON when the machine is conditioned for operation, which conditions a process latch 215,217 and a time signal, for operation. These two latches, when operated, furnish signals to indicate that the machine is to be operable and further are responsive to other conditions for terminating operation. These condition-signals are indicated by lines 202, 204 and 219 with appropriate legends.

A series of latches, FIG. 3b, are utilized to initiate the generation of a given cycle, I, A or B, in response to predetermined conditions to be described subsequently. These latches 235, 237, (delta I); 291, 289 (delta B); and 267, 269 (delta A), have a normal mode of operation in controlling the machine to generate I, A or B cycles which may be varied by the condition signal applied thereto.

In FIG. 3c, an I cycle latch 243, 245, a B cycle latch 302, 304 and an A cycle latch 277, 279 is shown to generate the I, A or B cycles in accordance with the delta latches actuated at the end of the preceding cycle.

The elements shown in the circuits to be described are transistorized logic blocks such as shown in application Serial Number 838,456, now abandoned. There are a number of AND circuits contained herein, some of which have only one input and thus act as voltage setting devices or isolation circuits. These will all be referred to as AND circuits. The inverter AND circuits are utilized to furnish different voltages.

Assuming that the machine is now processing data, the delta process latch 201, 203 will be ON, FIG. 3a. This process latch consisting of an inverter AND circuit 201 and inverter 203 operates when set to maintain a fixed voltage level output until reset. With the delta process latch 201 and 203 turned ON, a signal will be coupled through a driver 211 to an AND circuit 213, FIG. 3a, which is conditioned at a time 000 to 030 to set the process latch consisting of AND circuit 215 and 217 to provide a signal to the output of AND 217. The process latch may be turned OFF as shown at 219.

The output of the AND 217 is coupled to an AND circuit 223 which at a time 075 to 105 furnishes an output signal to a driver 225. Assuming that a new instruction word is to be loaded into the A MAR and B MAR to indicate a new operation, a signal will be present on line 227 denoted as an I/E change (instruction execute) which is coupled to an AND circuit 229, FIG. 2b. The signal from the driver 225, line 231, is also connected to the AND circuit 229 with a signal on line 223 indicative that a B cycle is then being executed in the machine. In the ordinary case the instruction execute changes take place on a B cycle so that a signal on the B cycle latch line 233 will cause the AND circuit 229 to furnish the signal to a delta I latch consisting of an AND circuit 235 and an inverter follower 237 to set the same and to indicate that the next cycle will be an I cycle.

Figure 4:
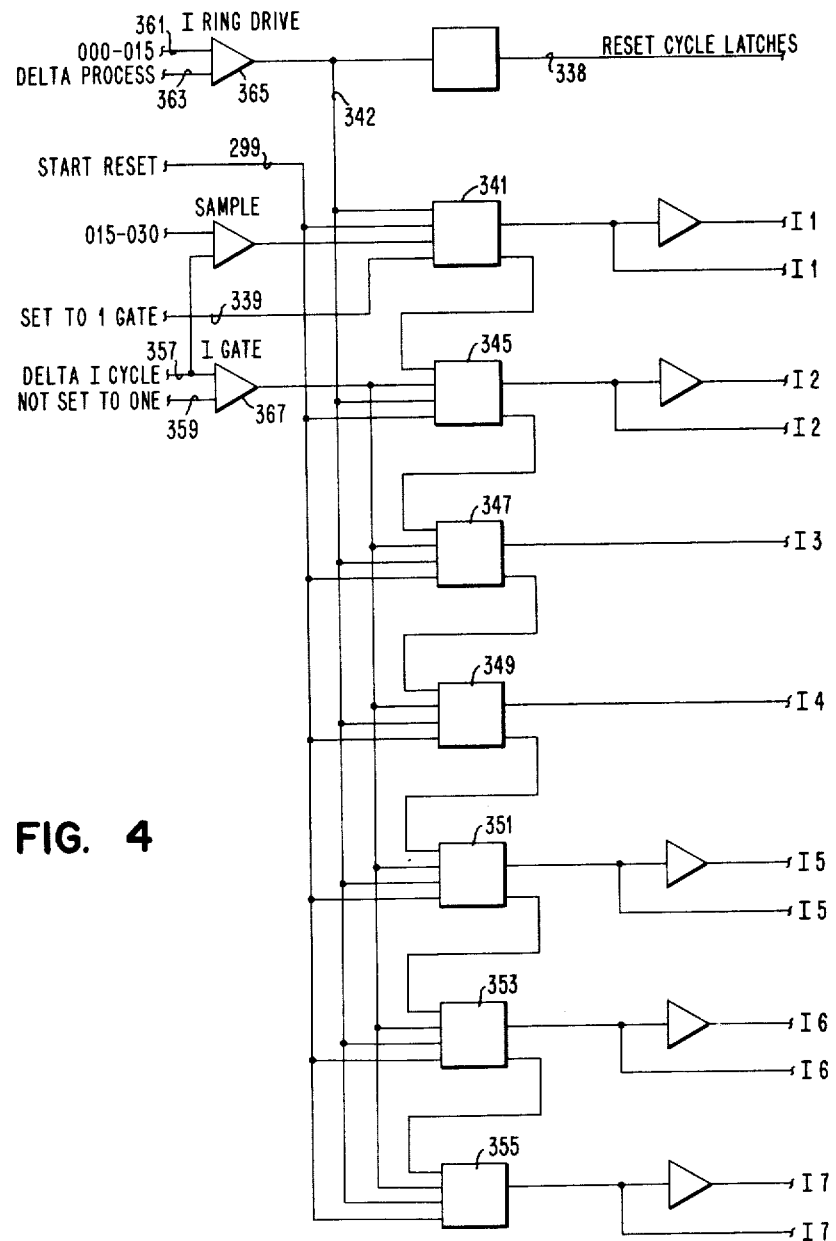
FIG. 4 is an illustration of the circuit used in generating instruction pulses.

A number of different events occur when the delta I latch is set to produce a signal output, one of which is to cause a signal to be coupled through an AND circuit 239 to an AND gate 241 which at a time 000 to 060 produces an output to set the I cycle latch consisting of AND circuits 243 and 245. The output of the I cycle latch is coupled to an AND circuit 247 with a process signal on AND 313 through a further AND 253 to provide the output of the I cycle latch which in turn controls various elements in the processing system. An I ring which is used to generate the instruction pulses I–1 through I–7 is shown in FIG. 4 and consists in a number of triggers 345 which are operated sequentially to generate the various pulses shown numbered thereon. This ring operates by turning one trigger OFF which in turn is coupled to the next trigger, turns this trigger ON. A line 342 is connected to all triggers and is utilized as the drive pulse which operates all triggers to an OFF position at which time the coupling action between triggers takes place to set the next sequential one. Referring to FIG. 5, there is a latch 329, 331 which is called "set to 1 latch" which is utilized to set up the chain of triggers to provide the proper sequence. In this case an AND circuit 323 in cooperation with a B cycle on line 306, an indication of an I/E change on line 325, at a time 060–090 on line 327, produces a raised output to set the AND circuit 331 and AND 329. The reset for the "set to 1 latch" is shown by a line 335 which is an I–1 pulse, at a time 090 to 000 on line 337, coupled through an AND circuit 333 and inverter 335. In the absence of the conditions on lines 335 and 337, the inverter will provide the correct voltage pulse to keep the latch set. The start reset line 294 coupled through diode 321 is utilized in the same manner as the start reset shown in cooperation of the delta B latches described previously.

When the "set to 1 latch" goes ON the line 339 of FIG. 4 has the proper voltage signal to set the trigger 341. The "set to 1" line 339 operates as a gate to allow the trigger 341 to be operated and also provides that the other triggers 345 through 355 will be turned OFF by the delta I-cycle 357 and the "not set to 1" line 359 through gate 367 which prevents any trigger 345 through 355 from being operative. In other words, this provides for the resetting action by use of the gates. On I–1 cycle time at time 090 to 000, the "not set to 1 line" 359 will come up and allow each trigger 345 through 355 to be sequentially set. The ring drive 342 is shown coupled through the AND circuit 365 and is conditioned by a timing signal 000 to 015 on line 361 and the delta process line 363 which for each cycle will step the triggers to the next succeeding one.

Referring to FIG. 7, signals on line 551, which indicate an I cycle, and line 253 which indicate a "gated word mark" (word mark sensed in B register on any I-cycle other than I–1), condition the AND circuit 255 to provide a signal through an OR circuit 257 to indicate an instruction execute change. This gated word mark 253 is connected to the B register word mark bit so that when the final digit in the instruction cycle is read out, which it will be remembered contains a word mark in the 8th position or one subsequent to the I–7 cycle, there will be a change to indicate that the machine should now proceed into its execution cycle in which the operation indicated in the operational register will be performed.

AND circuit 552, FIG. 3b, is conditioned by the delta process latch gate from driver 225, FIG. 3a, a signal from the I-cycle latch on line 362 which it will be remembered is now ON and an instruction execute change I/E on line 227 to provide an output from AND 259 through the AND 261 to the inverter 263 which will reset the delta I latch 235, 237.

When the AND circuit 259, FIG. 3b, produces a signal, this same signal from AND circuit 259 is connected to AND circuit 268 which with a signal from circuit 264, which indicates "not A cycle eliminate," produces an output to set the delta A latch consisting of AND circuit 267 and inverter 269. The delta A latch 267 and 269 produces an output to AND circuit 271 which is also connected to the delta process line to produce a delta A cycle. This signal is coupled to AND circuit 273 which at a time 000 to 060, line 275, sets the A cycle latch consisting of AND circuit 277 and AND circuit 279 to produce a number of outputs including an A cycle output through AND circuit 281 in a similar manner to that produced for AND circuit 247 in the I latch.

At this time, it might be well to consider the timings of the various cycles. By referring to the AND circuit 223 which connects the process line (indicating that the machine is running) to the delta gates, it can be seen that the gate 223 has an output between 075 and 105. This timing is in the cycle preceding the point at which it is necessary that the particular cycle be taken. This is noted in relationship to the I-cycle latch which is turned ON at 000, referring to AND circuit 241, FIG. 3c, and to the AND circuit 273 in the A cycle latch. The output from AND circuit 283, FIG. 3b, is connected to an AND 287 which sets a delta B latch consisting of AND 289 and AND circuit 291. At the same time the output from AND 283 is connected through an AND 554 and inverter 295 to reset the delta A latch 267, 269 and turn this latch OFF. This happens only when the delta cycle latch gate is up between 075 and 105 in the succeeding cycle in which the A latch was turned ON.

By similar operation the AND circuit 293 connected to a line 295 is operative to reset the delta B latch in the following manner. When the delta B latch went ON, the output from AND 289 was coupled through the AND circuit 292 to the AND circuit 300 which is timed at the beginning of the cycle to set the B cycle latch 302 and 304 and generated B cycle on line 306 through AND circuit 308. With the B cycle latch turned OFF by AND 293 and inverter 299, the signal from AND circuit 293 is connected to an AND circuit 301 which with a signal on line 303 noted as "not I/E change" which will set the A latch.

In the absence of a signal on line 266 (which would indicate that the A cycle is not to be eliminated), the delta latches A and B select the A and B latch alternately to select the characters from the A and B MARS. However, when the "not A cycle eliminate" is absent, the delta B latch is not reset and the apparatus continues to take B cycles until the signal "not A cycle eliminate" returns. The control signal for this will be explained subsequently. It should be noted that the AND circuit 556 is operative in an instruction execution cycle when a new instruction word is to be stored in the A and B MARS to generate a signal to reset the delta B latch 289, 291. As it will be recalled the B latch is ON when a new instruction cycle is taken. To initiate a series of I cycles, a delta I-cycle latch is initiated by a signal on a start reset line 294 through an AND unit 551 to the diode 303 to set the delta I latch and to condition the delta B latch through follower 305 and the A latch through follower 307 to turn these OFF and initiate an instruction cycle reset.

The I-cycle latch, the B cycle latch and the A cycle latch, FIG. 3c, have associated therewith a series of manual keying lines 361, 363 and 370. When the machine has terminated operation for some reason, a signal may be impressed on the desired line 361, 363 or 370 to activate the display associated with the particular register with which the signal was associated. This allows the programmer to see what is in the various registers.

When the machine does stop, the A, B or I cycle latch will be ON and a signal be coupled to the lines 362 or 310 or 367 to activate the character display register associated therewith. When a selection is made by key different from the cycle latch which is ON when the machine stopped, this will drop out the other latch which was ON by means of the AND circuits 245, 304 or 279. When the machine is restarted, however, the delta cycle latches, FIG. 3b, which were not dropped out, select the cycle latch, FIG. 3c, which was ON when the machine ceased operation to initiate the cycle at this point.

In FIG. 5, the apparatus for terminating operation of the A memory address register in response to a word mark is shown as a latch consisting of AND circuits 372 and 373. This latch is conditioned by signals on lines 375–377, which are applied to AND circuit 374 to signal the AND circuit 373 which is also conditioned by a signal on line 378, not I-cycle.

The output of AND circuit 373 is applied through OR circuit 379 to the line 263 and through AND 380. This, it will be remembered, in reference to FIG. 3b, operates the machine on B cycles only as long as the signal is present. Signals on lines 381–384 of the nature indicated also eliminate the A cycle.

The AND circuit 385 is conditioned by a word mark at I–6 time to condition AND circuit 386 along with a signal from AND circuit 331. This signal on line 387 goes to the I-A MAR gates, lines 95 and 99. This is used in an instruction with an operation code designating that the instruction word is to be taken from an address located in the A MAR modified and transferred to the I-MAR.

The circuit of FIG. 7 is used for a variety of purposes. The AND circuit 255 is used to detect the word mark used for an instruction cycle in order to recognize the end of the instruction word by the presence of a word mark. This was explained previously in relation to the instruction change.

The OR circuit 389 couples signals on lines 390–392 to the AND circuit 393 which is conditioned by a B cycle on line 306 to produce a signal on line 227 for an instruction execution change. The signals on line 390 are:

MZS—Move with zero suppress removes leading non-significant zeros from operand
E—Edit
I/E—Instruction-execution change Each of these signals on lines 391 and 392 originate from the operation register to instruct the machine to go into an execution cycle. The signal on line 390 is transmitted from the edit control.

The signals applied to OR circuit 398 are concerned with the B address operand and are applied to an AND circuit 394 which is conditioned by a B cycle signal on line 396 and a signal on line 399 indicating that the A word mark latch is ON. This also causes an I/E change.

A reverse scan latch consisting of AND circuits 402 and 404 is set by signals applied to AND gate 401. This operation is included in an editing operation when the word at the B location is to be rescanned. The signal from the latch is used to generate the control signal for a reverse scan operation in which the address modifier is controlled to add "one" to the address contained therein for successive cycles taken. When the scanning has been completed, an AND circuit 400 will be conditioned to turn the latch OFF as well as go through OR 405 to readdress the data word and read the characters again in the forward direction. The AND circuit 401 senses the presence of a B cycle and a gated word mark 253 to generate an instruction execute change in the event that the operation is to be terminated.

The circuit at the bottom of FIG. 3a is used to enter data manually into the storage of the machine. With character bit keys on the console selected for the particular character desired to be entered into storage, the manual entry line 413 and enter key line 414 will have a signal thereon coupled through AND 409 to set the latch 402, 403 through AND 401. This activates memory through 404 and resets the address register through AND 420. The D cycle latch 402, 403 provides one cycle. The restore signal to reset this latch is provided by AND 408 with the time pulse shown.

The memory scan and memory print lines 415, 416 are concerned with transferring of a number of characters from memory so a plurality of D cycles are taken.

While the invention has been particularly shown and described with reference to a preferred embodiment thereof, it will be understood by those skilled in the art that various changes in form and details may be made therein without departing from the spirit and scope of the invention.

What is claimed is:

1. In a data processing machine including a storage device for storing a plurality of characters at selectable address locations, a plurality of storage address registers each containing a number indicative of the address of an operand character which is to be read therefrom, each said storage register being set to indicate the addresses of the first characters of each of the operands to be used in a machine operation, an instruction address register containing a number indicative of the address of the first character of a series of instructions, wherein said instructions each contain an operation character for determining the successive operations of said machine and numbers which are the addresses to be used, respectively, in said storage registers, means modifying the contents of said storage address registers as each character is addressed, respectively, by said storage address registers, one said operand character including a character marking bit, means for sensing said marking bit to produce the termination of a machine operation under control of a first operation character and for selecting the next successive operation character to control the operation of the machine and means responsive to said next operation character for operating said machine, with the addresses of the operands as the addresses contained in said storage registers at the termination of the previous operation.

2. In a data processing machine including a storage device for storing a plurality of characters at selectable address locations, a storage address register containing a number indicative of the address of an operand character which is to be read therefrom, said storage register being set to indicate the address of the first character of an operand to be used in a machine operation, an instruction address register containing a number indicative of the address of the first character of a series of instructions wherein said instructions each contain an operation character for determining the successive operations of said machine and a number which is the address to be used in said storage register, means modifying the contents of said storage address register as each character is addressed by said storage address register, one said operand character including a character marking bit, means for sensing said marking bit to produce the termination of a machine operation under control of a first operation character and for selecting the next successive operation character to control the operation of the machine and means responsive to said next operation character for operating said machine, with an operand having, as its address, the address contained in said storage register at the termination of the previous operation.

3. In a data processing machine including in combination a storage device for respectively storing a plurality of items at selectable address locations, a storage register for storing a number indicative of the address of an item to be read from said storage device, said item to be used as an operand in a machine operation, means for modifying the the number stored in said storage address register for each item read from storage, an instruction address register containing a number indicative of the address of the first instruction containing an operation portion, and an address portion to be used in said storage register, means controlled by said operation portion for operating upon an item selected from a location designated by said address portion in said storage register, said modifying means thereupon modifying the number stored in said storage register, and means responsive to a succeeding instruction comprising an operation portion but no address portion for controlling operations upon a first operand at the location designated by the modified number in said storage address register at the end of said first instruction.

4. In a data processing machine including in combination a storage device for respectively storing a plurality of items at selectable address locations, a storage address register for storing a number indicative of the address of an item to be read from said storage device, said item to be used as a factor in a machine operation, means for modifying the number stored in said storage register for each item read from storage, an instruction address register containing a number indicative of the address of a first instruction containing an operation portion, and an address portion to be used in said storage register as the address of a first item to be selected from said storage device, said address register contents being modified as each item is withdrawn from storage, and means responsive to succeeding instructions containing operation portions but no address portions for controlling operations upon operands respectively designated by the modified number in said storage register at the end of each of said succeeding instructions.

5. In a data processing machine including in combination storage means for respectively storing items at selectable address locations, a pair of storage address registers for controlling the selection of said stored items, means for modifying the contents of said storage address registers as items are selected from address locations, means storing an instruction containing an operation portion and address portions, means receiving said operation portion, said address portions being respectively transferred to said storage address registers, means controlled by said operation portion for acting upon items selected from the addresses in storage indicated by said storage address registers, said modifying means changing the contents of said storage address registers, respectively, upon selection of said items, a second instruction containing an operation portion but no address portions and means controlled by said last operation portion for acting upon items selected, from addresses in storage, indicated by said storage address registers, respectively, at the end of said first instruction.

6. In a data processing machine including in combination storage means for respectively storing items at selectable address locations, a storage address register for controlling the selection of said stored items, means for modifying the contents of said storage address register as items are selected from address locations, means storing an instruction containing an operation portion and an address portion, means receiving said operation portion, said address portion being transferred to said storage address register, means controlled by said operation portion for acting upon an item selected from the address in storage indicated by said storage address register, said modifying means changing the contents of said storage address register upon selection of said item, a second instruction containing an operation portion but no address portion, and means controlled by said last operation portion for acting upon an item selected from an address in storage, indicated by said storage address register at the end of said first instruction.

7. A device as in claim 6 and including means for rendering operative successive instructions containing operation portions but no address portions, said operation portions respectively acting upon items selected from addresses in said storage address register, successively assumed by said storage address register, as said modifying means modify the contents of said storage register.

References Cited in the file of this patent
UNITED STATES PATENTS

| | | |
|---|---|---|
| 2,891,238 | Nettleton | June 16, 1959 |
| 2,891,723 | Newman | June 23, 1959 |
| 2,916,210 | Selmer | Dec. 8, 1959 |